Sept. 11, 1962 W. R. R. PARK ET AL 3,053,695
HEAT SEALABLE COATED FILMS OF MONOALKENYL
AROMATIC POLYMERIZATES AND A PROCESS
FOR PREPARING THE SAME
Filed July 20, 1959

Dried adherent coating consisting essentially of ethyl cellulose, a polyester of an alkyl substituted benzoic acid and a polyhydric alcohol, wax, and a plasticizer Solid substratum of a polymer of at least 50 weight percent of a monoalkenyl aromatic monomer INVENTORS.
William R. R. Park
Stanley F. Roth
BY
AGENT

# United States Patent Office 3,053,695
Patented Sept. 11, 1962

3,053,695
HEAT SEALABLE COATED FILMS OF MONOALKENYL AROMATIC POLYMERIZATES AND A PROCESS FOR PREPARING THE SAME
William R. R. Park and Stanley F. Roth, Midland, Mich., assignors to The Dow Chemical Company, Midland, Mich., a corporation of Delaware
Filed July 20, 1959, Ser. No. 828,024
11 Claims. (Cl. 117—138.8)

This invention relates to a process for imparting heat sealing properties to films which are normally incapable of being heat sealed with conventional apparatus. The invention further contemplates coated articles prepared by said process.

This application is a continuation-in-part of U.S. Serial No. 760,876, filed September 15, 1958, and now abandoned.

One of the problems facing the flexible film converter is the attainment of proper closures and means for manufactured packages. Such closures and seams may be made with pressure sensitive adhesives or with mechanical closures or fasteners, such as staples. Both of those methods required multi-step manipulations and are usually inadequate when an impervious seal is desired. With many materials which are thermoplastic, the closures and seams may be formed by drawing the edges of the bag or pouch between two heated shoes to provided a continuous, impervious heat seal. Such a heat sealing technique is well adapted and has been universally accepted for use with high speed packaging operations and is inexpensive in operation. The seals are continuous and as impermeable as the material from which the packaging material is made. However, many materials, such as oriented polystyrene film and the films of like styrene polymers, although thermoplastic, cannot be self-sealed in such manner. When polystyrene film is attempted to be sealed thermally with the conventional heated-bar sealers, there generally results either that no seal is formed, or an unattractive and unsatisfactory mass of molten polymer, or a shirred discontinuous seal due to shrinkage caused by loss of the orientation of the film.

Oriented styrene polymeric film materials and the like are valuable, flexible packaging films. The extent of their use would be even more widespread if a satisfactory process for heat sealing were available.

The previous coating means for imparting heat sealability to such materials required the use of a primer to achieve adequate adhesion. The heat sealable coating was then applied over this primer. Such processes and techniques require the inventory of two separate coating compositions and the use of two separate manipulative steps with two independent apparatuses. Thus these two-step processes were time consuming and expensive in operation and capital investment.

It is accordingly the principal object of this invention to provide a process for imparting heat sealing properties to those flexible films of styrene polymers which films of themselves are incapable of being conveniently heat sealed using conventional apparatus.

It is a further object to provide such a process which involves but a single coating step.

Still another object is the provision of a coated article which is capable of heat sealability.

The above and related objects are accomplished by the process consisting of applying to the monoalkenyl aromatic polymer article a continuous coating of a film-forming solution consisting essentially of (1) ethyl cellulose; (2) a polyester of an alkyl substituted benzoic acid having from 1 to 4 carbon atoms in the alkyl group and polyols; (3) a wax; (4) a plasticizer for said ethyl cellulose, and (5) an organic solvent for the said ingredients listed in (1) to (4).

The films which are contemplated as subject materials for use in the process of this invention are those flexible films and foils as well as semi-rigid and rigid articles prepared from polystyrene and other alkenyl aromatic polymers containing at least 50 percent by weight of a monoalkenyl aromatic monomer having from 6 to 10 carbon atoms in the aryl nucleus and of the general structure: $CH_2=CR—Ar$, wherein R is methyl or hydrogen and Ar is the aryl nucleus, advantageously one that contains from 6 to about 10 carbon atoms (including the carbons in alkyl ring substituents) in its nucleus. By such monoalkenyl aromatic polymers and copolymers it is intended to include the resinous thermoplastic materials resulting from the polymerization of monovinyl aromatic monomers, such as para-methylstyrene, alpha-methylstyrene, meta - ethylstyrene, ortho - para - dimethylstyrene, ortho-para-diethylstyrene, para-chlorostyrene, isopropylstyrene, ortho-methyl - para - isopropylstyrene and ortho-para-dichlorostyrene, and also those materials resulting from the copolymerization of styrene with alpha-methylstyrene or with one or more of any of the above named compounds. Thermoplastic copolymerizates of styrene or of the other aforementioned compounds with other monoethylenically unsaturated monomers, such as acrylonitrile, may also be used. The term "monoalkenyl aromatic polymer" as used herein is intended to include the thermoplastic polymers and copolymers of monoalkenyl aromatic compounds having the alkenyl radical directly attached to a carbon atom of an aromatic nucleus which compounds may also contain one or more alkyl or halogen atoms as nuclear substituents, just described.

Flexible films may be prepared from the above described thermoplastic materials by thermal fabrication, specifically thermal extrusion. Processes, techniques and apparatuses for such fabrication are known. Other techniques include the solvent casting or dipping of the compositions from a volatile solvent followed by evaporation of that solvent. As prepared, such films must be oriented for flexibility. Unoriented films are so brittle and weak in other properties as to have no commercial utility in packaging or similar uses. Flexible films of these polymerizates of monoalkenyl aromatic monomers may be prepared in a variety of gauges, thicknesses, colors and widths. Since the modifications contemplated by this invention involve primarily surface phenomena, they are adaptable to any size, shape or thickness where uniform coatings may be applied. The modifications are useful with moldings, extrusions, or any other thick section of a rigid or semi-rigid nature. With such articles of thick section the need for heat sealability is rather remote. Consequently, the attainment of that property alone may not be justification for treatment. However, the process results in other advantages as will be described. Thus, it is not intended to limit the process or the resulting articles to any particular size or shape, although heat sealable-flexible films are the preferred end products.

One of the basic film-forming ingredients of the coating composition used in the process of this invention is an ethyl cellulose. For use in this invention it is essential that the ethyl cellulose be organo soluble. The water soluble varieties of ethyl cellulose are difficultly heat sealable and even when seals are possible, are subject to damage on exposure to high humidities.

The polyester component is composed of an alkyl substituted benzoic acid wherein said alkyl substituent contains from 1 to 8 carbon atoms with polyols. Typical of such polyesters and representing a highly advantageous species is the product of para-tertiary-butyl-benzoic acid and trimethylol ethane. Other acids including for example cresylic acid, para-ethyl benzoic acid, para-isopropyl benzoic acids are also operable. In similar fashion other polyols, including the glycols, will be known. Still further the polyesters may contain small amounts of certain materials such as phthalic anhydride for special effects without loss of the benefits of this invention. Thus judicious choic of polyester will be able to be made by the skilled worker from these available materials.

In addition to the polymeric components the coating composition used in the process of this invention also contains a small amount of a wax. Waxes suitable for the compositions are those having a melting point of at least 60° C. and preferably those that melt between about 60° and 100° C. Those with lower melting points generally tend to cause the coated films to block. Typical representative of such waxes are those of the following groups: (a) the true waxes, i.e., the esters of high molecular weight monohydric alcohols and higher fatty acids, examples of which are spermaceti, carnauba, montan, beeswax, Japanese wax, Chinese insect wax, etc.; (b) synthetic esters of polyhydric alcohols with the higher fatty acids, e.g. 1,2-hydroxy stearin, glycol stearate, diethylene glycol laurate etc.; (c) high melting fats, such as tallow (ordinarily used in conjunction with one of the other types); (d) synthetic esters of monohydric alcohols with the higher fatty acids, e.g., phenoxy ethyl stearate, lauryloxyethyl laurate, palmitic and stearic esters of the alcohols obtained by reducing palm or sperm oil fatty acids; (e) monohydric alcohols from the hydrogenation of natural oil fatty acids, and (f) monohydric alcohols from the saponification of waxes such as myricyl alcohol, cetyl alcohol and ceryl alcohol. The preferred wax is carnauba wax.

The block temperature mentioned above is the minimum temperature at which two surfaces of film in face to face contact will not slip apart when placed under an applied pressure for a time which is arbitrarily selected. The block temperature is of significance when the film is rolled up on itself and is shipped and stored in such manner. Likewise after conversion to bags and pouches the block temperature assumes an importance not only in shipping and storing, but also in feeding into package filling apparatus. For most commercial applications it has been found that this block temperature should be at least 140° F. when placed under an applied pressure of 1 pound per square inch for 24 hours.

The fourth component of the compositions is a small amount of a plasticizer for the ethyl cellulose. Such plasticizers are well known in the art. Typical of such materials are the dialkyl phthalates containing from 1 to about 8 carbon atoms in each ester group, the alkyl aryl phosphates such as tricresyl phosphate low molecular weight polystyrenes, castor oils, butyl phthalyl butyl glycolates and others. If desired, mixtures of the plasticizers may be used. Dibutyl phthalate represents a highly advantageous species to be employed in the composition.

The compositions to be used in the claimed process are in the form of an organic solution of the film-forming components. The useful solvents are those for the ethyl cellulose and other materials.

The organo soluble ethyl celluloses are soluble in the lower alkanols having from 1 to about 4 carbon atoms and these are the preferred solvents.

The proportions of the components making up the coating composition used in the process of this invention include about 30 to about 58.5 percent by weight of ethyl cellulose; about 40 to about 70 percent by weight of the polyester; from 2 to 20 parts and preferably from about 0.5 to about 4 percent by weight of the wax and from about 3 to 10 percent by weight of the plasticizers all of the said percentages being based upon the total solids weight of the composition. The ingredients are dissolved in from 80 to 200 parts by weight of solvent for every 20 parts by weight of solids. Any substantial departure from the above proportions will tend to have an adverse effect on one or more of the properties (such as adhesion, heat sealability, clarity or others) so as to preclude the use of the combination in the herein claimed process and application. The solution concentration permits relatively wide varation. This concentration wil be determinable by the coating thickness desired by the viscosity or fluidity desired with the coating technique to be used and by the solubility characteristics of the resin-solvent combination desired. Solutions of lower concentration will generally result in dried coatings of thinner section than those of higher concentration. The viscosity of a coating composition that is to be used in brushing or rolling techniques will generally be greater than that of a composition which is to be sprayed. Any of these determinants may be easily checked by simple preliminary experiments and the optimum solute concentration determined.

The compositions to be used in the claimed process are easily prepared by known mixing methods and techniques. The order of addition of the ingredients is not critical.

The coating of this process may be applied by known coating techniques including brushing, roller coating, dipping, spraying or other means. To maintain uniform reproducible properties and characteristics it is essential that each coating be of substantially uniform thickness. Thus after application or simultaneously therewith but before drying, there may be used known doctoring means such as doctor blades or squeeze rolls. For many applications this provides adequate uniformity of coating thickness. After the coating application the coating is dried into a continuous coherent coating. That drying may occur at room temperature although it is preferred to employ slightly elevated temperatures of 60° to 70° C. which appreciably shorten the drying step. Temperatures which are significantly higher than 70° C. should usually be avoided, since they tend to distort the shape or in some instances to destroy or at least alter the orientation, properties and characteristics of the substratum. To achieve heat sealability and other desirable properties it is only necessary that the dried coating completely cover the surface to be coated. As a practical matter such coatings, will, if conventional coating techniques are followed be of a thickness of at least about 0.00005 inch. Additionally, coatings which are greater than about 0.05 inch are difficult to dry without special apparatus and methods and impart little or no significant improvement in properties over the less thick coatings. Accordingly, it is preferred to have the combined coatings of a thickness of from about 0.0001 to 0.05 inch.

A schematic representation of the articles resulting from the present inventive concept is shown in the appended drawing. In that drawing it is demonstrated that the coating is in continuous, adherent relationship to the substratum. It should be apparent that the shape of the article may be other than the flat, planar shape illustrated. Likewise, as indicated above, it should be apparent that the coating thickness relative to the thickness of the substratum may be varied.

The articles prepared in accordance with this invention have the functional advantages of laminate-like structures. Thus the strength, toughness, flexibility and other like properties of the coated article are determined mainly by the substratum. Other properties such as heat sealability, barrier characteristics and solubility are determined by the coating. Adherence of the coating to the substratum also is inherent in the coating composition. Thus all of the materials must be used in the previously described proportions if the desired results are to be attained.

The articles may be treated in accordance with this invention on either one or all surfaces depending upon the end use for which the article is to be employed. The articles after treatment may have impressions printed or stamped thereon usually without affecting the barrier, heat sealability or other properties. Also coated, flexible films and foils may be used with conventional wrapping and packaging machinery without serious effect on the coating.

The operation of the process and the advantages of the article will be more apparent from the following illustrative example wherein all parts and percentages are by weight unless otherwise indicated.

*Example*

A sample of bilaterally oriented polystyrene film of a thickness of about 0.001 inch was coated with a composition of the following ingredients. 10 parts of ethyl cellulose, organo soluble; 10 centipoise viscosity grade; 10 parts of a polyester composed of para-t-butyl benzoic acid and trimethylol ethane; one part dibutyl phthalate; 1 part carnauba wax all dissolved in 120 parts of propanol. The coating was dried until clear. The dried coating thickness was about 0.0001 inch. The film was heat sealed to itself by placing two of the coating surfaces in contact and passing between the electrically heated jaws of a convention heat sealer. Continuous heat seals could be made by a jaw temperature of 185° F. The adhesion of the seal was tested by making a heat seal in the above manner which was 1 inch wide. One of the free ends of the modified film was clamped and the force required to pull the seal apart was determined. It was found that a force of 200 to 300 grams per inch was necessary to separate the so-formed heat seal. The adhesion of the coating to the substratum was checked by drying to separate the coating from the substratum using pressure sensitive tapes. No separation could be achieved in this manner.

What is claimed is:

1. A process for imparting heat sealability to thermoplastic articles fabricated from the polymerizates composed of at least 50 percent by weight of a monoalkenyl aromatic monomer having from 6 to 10 carbon atoms in the aryl nucleus with any remainder of at least one monoethylenically unsaturated comonomer consisting of applying to at least one surface of said thermoplastic article a continuous uniform coating of a film-forming composition consisting essentially of a solution of (a) about 20 parts by weight of a solute comprising (1) about 30 to 58.5 percent by weight of an organo soluble ethyl cellulose; (2) from about 40 to 70 percent by weight of a polyester of an alkyl substituted benzoic acid and a polyhydric alcohol; (3) from about 0.5 to 4 percent by weight of a wax having a melting point above 60° C.; (4) from 3 to 10 percent by weight of a plasticizer for said ethyl cellulose, and (b) from 80 to 200 parts by weight of a solvent for said solute followed by drying said continuous coating into a continuous adherent fused coating.

2. The process claimed in claim 1, wherein said article is a flexible oriented film of polystyrene.

3. The process claimed in claim 1, wherein the solvent is a lower alkanol having from 1 to 4 carbon atoms.

4. The process claimed in claim 3, wherein said lower alkanol is propanol.

5. A heat sealable article based on a substratum which has been fabricated of a polymeric material composed of at least 50 percent of a monoalkenyl aromatic monomer having from 6 to 10 carbon atoms in the aryl nucleus with any remainder of at least one monoethylenically unsaturated comonomer, said article consisting of a dried continuous coating in a continuous adherent relationship to said substratum, said dried continuous coating consisting essentially of a blend of (1) about 30 to 58.5 percent by weight of an organo-soluble ethyl cellulose; (2) from about 40 to 70 percent by weight of a polyester of an alkyl substituted benzoic acid and a polyhydric alcohol; (3) from about 0.5 to 4 percent by weight of a wax having a melting point above 60° C., and (4) from 3 to 10 percent by weight of a plasticizer for said ethyl cellulose.

6. The article claimed in claim 5, wherein said polyester is that of para-t-butyl benzoic acid and trimethylol ethane.

7. The article claimed in claim 5, wherein said wax is carnauba wax.

8. The article claimed in claim 5, wherein said plasticizer is a dialkyl phthalate having alkyl groups of from 1 to 8 carbon atoms.

9. The article claimed in claim 8, wherein said dialkyl phthalate is dibutyl phthalate.

10. The article claimed in claim 5, wherein said substratum is a flexible oriented self-supporting film of polystyrene.

11. The article claimed in claim 5, wherein said continuous coating is from 0.00005 to about 0.05 inch in thickness.

References Cited in the file of this patent

UNITED STATES PATENTS

| | | |
|---|---|---|
| 2,099,758 | Seymour | Nov. 23, 1937 |
| 2,350,292 | Sermattei et al. | May 30, 1944 |
| 2,453,214 | Figdor | Nov. 9, 1948 |
| 2,697,045 | Hetzel | Dec. 14, 1954 |
| 2,948,696 | Park | Aug. 9, 1960 |